Jan. 15, 1957 W. SHOCKLEY 2,777,906
ASYMMETRIC WAVE GUIDE STRUCTURE
Filed June 26, 1953
FIG. 1
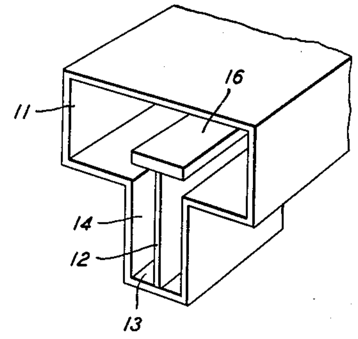
FIG. 4
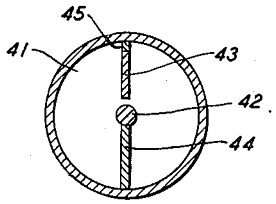
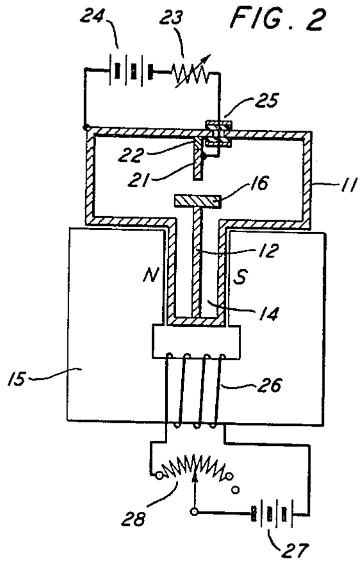
FIG. 3
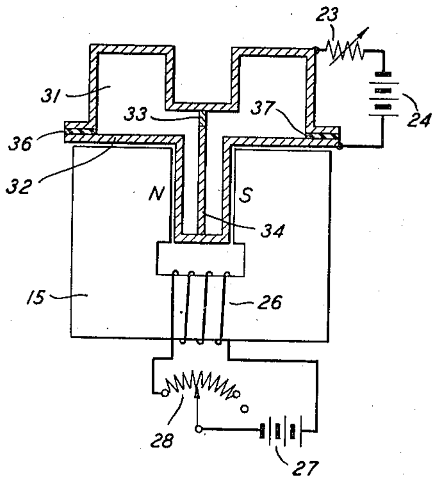
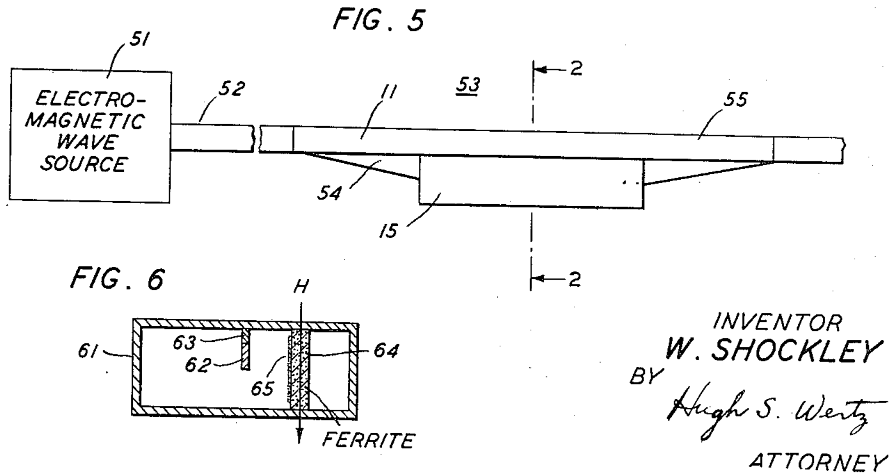
INVENTOR
W. SHOCKLEY
BY Hugh S. Wertz
ATTORNEY 2,777,906

ASYMMETRIC WAVE GUIDE STRUCTURE

William Shockley, Madison, N. J., assignor to Bell Telephone Laboratories, Incorporated, New York, N. Y., a corporation of New York Application June 26, 1953, Serial No. 364,291

12 Claims. (Cl. 179—171)

This invention relates to high frequency electromagnetic wave propagation and control and, more specifically, to wave guiding structures which have greater attenuation for one direction than for the opposite direction of transmission.

In electromagnetic wave guiding arrangements, it is often desirable to secure greater loss for one direction of transmission than the other. However, the nonreciprocal elements which will perform this function generally have relatively high loss and undesirable reflections in the direction of lesser attenuation.

Accordingly, one object of the present invention is to improve the quality of nonreciprocal microwave components.

It has previously been proposed to use negative resistance elements in wave guides to cut down losses. The amplification is greater the more nearly the negative resistance cancels the positive resistance, but instability or oscillation will occur if the negative resistance becomes equal to or greater than the positive resistance. Therefore, despite the simplicity of negative resistance elements, the instability which accompanies their use in high gain circuits has prevented their widespread use up to the present time.

Another object of the present invention is to reduce the instability of microwave circuits employing negative resistance elements.

In accordance with the invention, an element of a gyromagnetic material is coupled to an electromagnetic wave transmission line in asymmetric relation to the electromagnetic field configurations for the two directions of propagation. By way of example, one of the embodiments shown in the drawing shows a longitudinal strip of a Hall effect material bridged between the inner conductor and the enclosing conducting walls of a coaxial-like wave guide structure to secure better transmission for one direction of propagation than for the other.

A Hall effect material is a material such as germanium or bismuth in which the application of a magnetic field causes a deflection of current flowing in the material in a direction perpendicular to both the magnetic field and the direction of current flow.

With the addition of suitable negative resistance components to the nonreciprocal wave guide structures, amplification without oscillation can be achieved.

Other objects and various features and advantages will be developed in the course of the detailed description of the drawings.

In the drawings:

Fig. 1 illustrates a wave guiding structure including a septum of a Hall effect material;

Fig. 2 shows a cross-section of the structure of Fig. 1 with the addition of a negative resistance element;

Fig. 3 represents an alternative microwave amplification structure;

Fig. 4 depicts a coaxial embodiment of the amplifier;

Fig. 5 is a schematic showing of a wave guide transmission system employing an amplifier of the type shown in any of Figs. 1 through 4 of the drawings; and Fig. 6 illustrates an alternative version of the arrangement of Fig. 2 in which the non-reciprocal element is a magnetically biased plate of ferrite material.

Referring more particularly to the drawings, Fig. 1 shows by way of example and for purpose of illustration a generally rectangular hollow wave guide 11 which has a septum of a Hall effect material 12 located asymmetrically within the wave guiding passageway. One longitudinal edge of the septum 12 contacts the wave guiding structure 11 at the bottom 13 of a longitudinal recess 14 in the wider side wall of the rectangular passageway 14. As illustrated in the cross-sectional view of Fig. 2, the geometrical configuration of the septum and recess readily permits the application of a transverse magnetic field to the septum of Hall effect material. The polarizing magnet 15 is preferably a permanent magnet but can be a core energized by the electrical circuit including the electromagnet 26, the battery 27, and the variable resistance 28. Alternatively, structure 15 may be a permanent magnet, and its field strength may be varied by the use of the electromagnet 26 or a suitable magnetic shunt. Overlying the opposite edge of the septum 12 adjacent the mouth of the recess 14 is a conductive strip 16.

Considering the operation of the device, charges induced in the conducting strip 16 by a running electromagnetic wave are carried in part by conduction in the septum 12 of Hall effect material. When a voltage is applied across a magnetically polarized element of Hall effect material, the current does not flow precisely in the direction of the voltage gradient but is displaced from this direction by an angle which has been termed the Hall effect angle, as discussed on pages 204 through 211 of the book, "Electrons and Holes in Semiconductors," by W. Shockley, D. Van Nostrand Company, Incorporated, New York, 1950. The conduction component carried by the septum of Hall effect material has a component of flow in the direction of propagation or opposite to it depending on the direction of the transverse magnetic field. This lack of symmetry produces a difference in attenuation for one direction of propagation as compared to the other.

In the cross-sectional view of Fig. 2, an additional longitudinal strip 21 of highly conducting metal is added within the wave guiding structure and is connected to the wall of the wave guide by a negative resistance structure 22. The transit time negative resistance structure disclosed in W. Shockley application Serial No. 333,449, filed January 27, 1953, may be used for this portion of the structure. The negative resistance element disclosed in the above-identified application is a body of a semiconductor having a thin layer of one type of conductivity sandwiched between two layers of different conductivity type. Other known types of negative resistances may be employed, however. Currents passing through the negative resistance strip 22 furnish power to the wave and, therefore, produce a growing wave. This growth is adjusted so that it does not overcome the attenuation in one direction but does overcome it in the other. Amplification in one direction and attenuation in the other result from this arrangement.

The negative resistance must, of course, be biased to furnish power to the propagated wave. This biasing circuit connected between the conducting strip 21 and the wave guide wall includes the variable resistance 23 and the voltage source 24. A suitable structure 25 allows passage of the biasing current through the wave guide wall to the conductor 21 without undue distortion of the field pattern.

Fig. 3 illustrates a wave guiding structure which is divided into upper and lower conducting sections 31 and 32, respectively, to facilitate the application of bias potential across the negative resistance element 33. This biasing circuit is completed from the negative resistance element 33 through the upper portion of the wave guide 31, the variable resistance 23, the voltage source 24, the lower portion of the wave guide 32, and the septum of Hall effect material 34. The outwardly extending flanges of the upper and lower sections of wave guide are separated by strips of insulation material 36 and 37. These flange structures may have a lateral extent of one-quarter wavelength from the wave guiding passageway and may include other suitable wave trapping structure to prevent undesired radiation losses.

Another alternative shown in Fig. 4 involves the coaxial structure 41 with the center coaxial conductor 42 and an additional conducting strip 43 within the wave guiding passageway. The Hall effect septum 44 and the strip of negative resistance material 45 are connected from different points on the wall of the wave guiding passageway 41 to the center conductor 42 and the conducting strip 43, respectively. Suitable polarizing magnet and electrical biasing means (not shown) are employed to obtain proper operation.

In each of the embodiments of Figs. 2 and 4, the two metal strips in the wave guiding passageway may be joined to form a single elongated conductive strip. This has the effect of introducing an unnecessary flow of direct current through the germanium elements, but this has no adverse effect on their directive attenuation properties. The resultant single conductor structure is somewhat simpler in form and is somewhat easier to construct.

Fig. 5 illustrates an extended transmission line employing amplifying units of the type disclosed hereinbefore spaced periodically along its length. The high frequency electromagnetic wave source 51 energizes the wave guide 52, and, after a substantial distance of transmission, the amplifier or repeater unit 53 is inserted in the line. Tapered transition sections 54 and 55 minimize reflection losses in the change from the wave guide to amplifier cross-section. The section taken through 2—2 in Fig. 5 may correspond, for example, to the embodiment of the invention shown in Fig. 2. The polarity of the magnet 15 in Fig. 5 is such that attenuation is less in transmission from left to right than from right to left. The negative resistance elements are then adjusted to give amplification which more than compensates for the loss of line 52 between source 51 and the loss through repeater 53 in the forward direction from left to right but which gives a net loss in the backward direction. Stable gain in the forward direction without oscillation or singing is thus obtained.

In Fig. 6, the rectangular wave guide 61 is provided with the usual inner conductor 62 and negative resistance material 63 which is biased by a suitable source of potential in the manner illustrated in Fig. 2. Instead of the biased Hall effect material, however, this structure employs a transversely polarized septum of ferrite 64 to obtain the nonreciprocal attenuation effect. This ferrite element is transversely magnetized as indicated by the arrow H to a suitable field strength. When the ferrite element 64 is magnetized to ferromagnetic resonance, as disclosed in the copending application of W. H. Hewitt, Jr., application Serial No. 362,191, filed June 17, 1953, the ferrite element alone is sufficient to provide nonreciprocal attenuation. At lower magnetic field strengths, the resistive vane 65 produces nonreciprocal attenuation through interaction with the electromagnetic fields which are oppositely displaced for the two directions of transmission, as detailed in the copending application of S. E. Miller, application Serial No. 362,193, filed June 17, 1953. As in the Hall effect devices noted above, the negative resistance 63 and the nonreciprocal attenuation structure 64, 65 are properly related, by varying the respective biasing fields so that the gain provided by the negative resistance overcomes the losses for one direction of transmission but not for the opposite direction of propagation.

It is to be understood that the above-described arrangements are illustrative of the application of the principles of the invention. Numerous other arrangements, involving, for example, the use of other types or shapes of negative resistance and directionally selective attenuation means, may be devised by those skilled in the art without departing from the spirit or scope of the invention.

What is claimed is:

1. In combination, a conductively bounded wave guiding passage, an element of material exhibiting a large Hall angle extending into said passage from a surface thereof, and a conductive element extending along said passage in contact with said element but spaced apart from said passage.

2. The combination as set forth in claim 1, wherein a negative resistance element within said passage is electrically connected to said conducting passage.

3. In combination, a transmission line, distributed amplifying means extending along a section of said transmission line, and distributed attenuation means extending along substantially the same section of transmission line for attenuating electromagnetic waves propagating along said transmission line in one direction to a greater extent than electromagnetic waves propagating in the opposite direction.

4. In combination, a high frequency electromagnetic wave propagation line, negative resistance means coupled to said line for amplifying said electromagnetic waves, and a polarized Hall effect element of substantial longitudinal extent coupled to said line for selectively attenuating electromagnetic waves traveling in one direction along said wave propagation line as compared to electromagnetic waves traveling in the opposite direction along said wave propagation line.

5. A stable solid state microwave amplifier comprising a hollow conductive wave guiding passageway, conducting means within and spaced from said passageway, a septum of a Hall effect material electrically coupling said conducting means and said wave guiding passageway, and negative resistance means connected between said conducting means and said passageway.

6. In combination, a hollow conductive wave guide having a passageway therethrough, and a septum of a Hall effect material within said passageway and having one edge contacting a wall of said passageway.

7. In combination, a hollow conductive wave guide, means distributed along a section of said wave guide for providing a first predetermined loss for electromagnetic waves transmitted in one direction through said wave guide and a substantially greater second predetermined loss for electromagnetic waves propagating in the opposite direction, and negative resistance means for providing gain greater than said first predetermined loss but less than said second predetermined loss.

8. A device as set forth in claim 7 wherein the distributed directional loss means is a septum of a Hall effect material.

9. An amplifier comprising a hollow conductive wave guiding passageway, an elongated septum of a Hall effect material asymmetrically located within said wave guide, negative resistance means for amplifying electromagnetic waves in said passageway, a source of biasing voltage coupled to said negative resistance means, and induction means for applying a polarizing magnetic field to said Hall effect element.

10. An amplifier comprising a hollow conductive wave guiding passageway, attenuation means located within said wave guide for attenuating electromagnetic waves propagating in one direction through said passageway to a greater extent than electromagnetic waves passing through said passageway in the opposite direction, negative resistance means for amplifying electromagnetic waves in said passageway, a source of biasing voltage coupled to said negative resistance means, and induction means for applying a polarizing magnetic field to said attenuation means.

11. In combination, a hollow conductively bounded wave guiding passageway, an elongated conducting structure located within and spaced from the walls of said passageway, negative resistance means connected between said conducting structure and a wall of said wave guide, and passive means for attenuating electromagnetic waves propagating through said passageway in one direction more than electromagnetic waves propagating through said passageway in the opposite direction.

12. A microwave amplifier comprising a hollow conductive passageway for the transmission of high frequency electrical signals, a negative resistance element located within and connected to a wall of said passageway, an element of Hall effect material spaced from said negative resistance element and located within and connected to a wall of said passageway, and conductive means associated with each of said elements for applying said high frequency signals to said elements.

References Cited in the file of this patent

UNITED STATES PATENTS

| | | |
|---|---|---|
| 1,778,796 | Craig | Oct. 21, 1930 |
| 2,420,342 | Samuel | May 13, 1947 |
| 2,464,807 | Hansen | Mar. 22, 1949 |
| 2,556,881 | McArthur | June 12, 1951 |

OTHER REFERENCES

Article: "A Nonreciprocal Microwave Component," by Kales et al., published Journal of Applied Physics, vol. 24, No. 6, June 1953, pages 816 and 817.